United States Patent [19]
Gibson

[11] Patent Number: 5,022,177
[45] Date of Patent: Jun. 11, 1991

[54] FISHING LURE HARNESS STRUCTURE

[76] Inventor: Thomas R. Gibson, 1204 Woodgate Dr., Kirkwood, Mo. 63122

[21] Appl. No.: 435,055

[22] Filed: Nov. 13, 1989

[51] Int. Cl.$^5$ ............................................. A01K 85/00
[52] U.S. Cl. ................................. 43/42.11; 43/42.13; 43/42.09
[58] Field of Search ................ 43/42.09, 42.11, 42.13, 43/42.14, 42.16, 42.19, 42.26, 42.44, 42.52

[56] References Cited

U.S. PATENT DOCUMENTS

| | | | |
|---|---|---|---|
| 3,828,463 | 8/1974 | Perrin | 43/42.39 |
| 3,858,343 | 1/1975 | Goforth | 43/42.39 |
| 4,033,065 | 7/1977 | Shannon | 43/42.13 |
| 4,536,986 | 8/1985 | Stout | 43/42.11 |
| 4,551,940 | 11/1985 | East | 43/42.11 |
| 4,718,191 | 1/1988 | Gentry | 43/42.11 |
| 4,793,089 | 12/1988 | Long | 43/42.31 |
| 4,827,660 | 5/1989 | Dudeck | 43/42.11 |

*Primary Examiner*—Kurt Rowan
*Attorney, Agent, or Firm*—Polster, Polster and Lucchesi

[57] ABSTRACT

A convertible harness structure for fishing lures including an integral wire body bent at four spaced areas along the wire body to provide a three leg harness of generally U-shaped configuration with one leg being in a plane offset from a common plane determining the other two connected legs, with two of the bent areas serving to respectively receive the end of a fishing line and a spinner lure and the other bent areas being offset to accommodate the shank of a hook intertwined with the one offset leg.

11 Claims, 3 Drawing Sheets

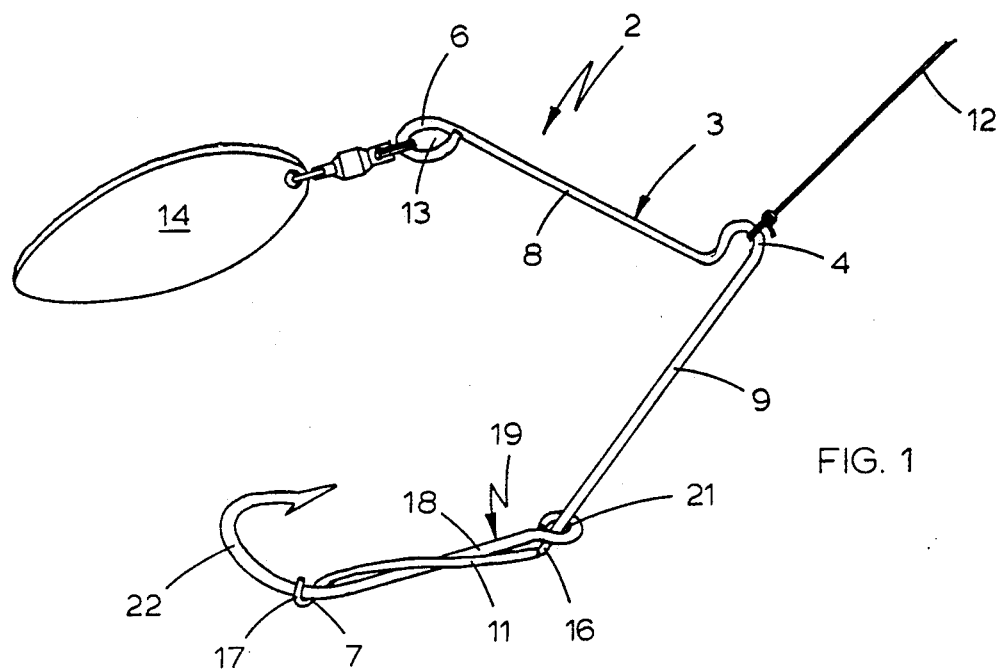
FIG. 1
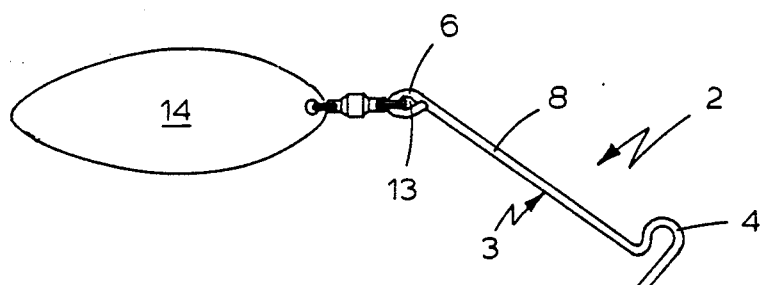
FIG. 2
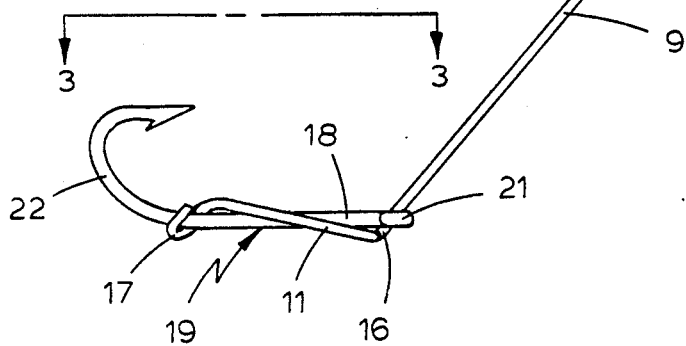
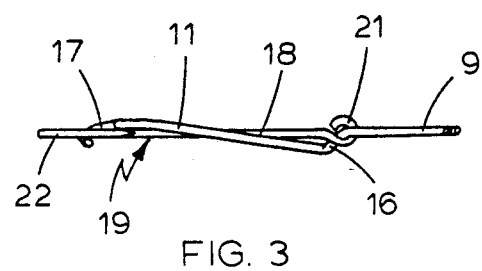
FIG. 3

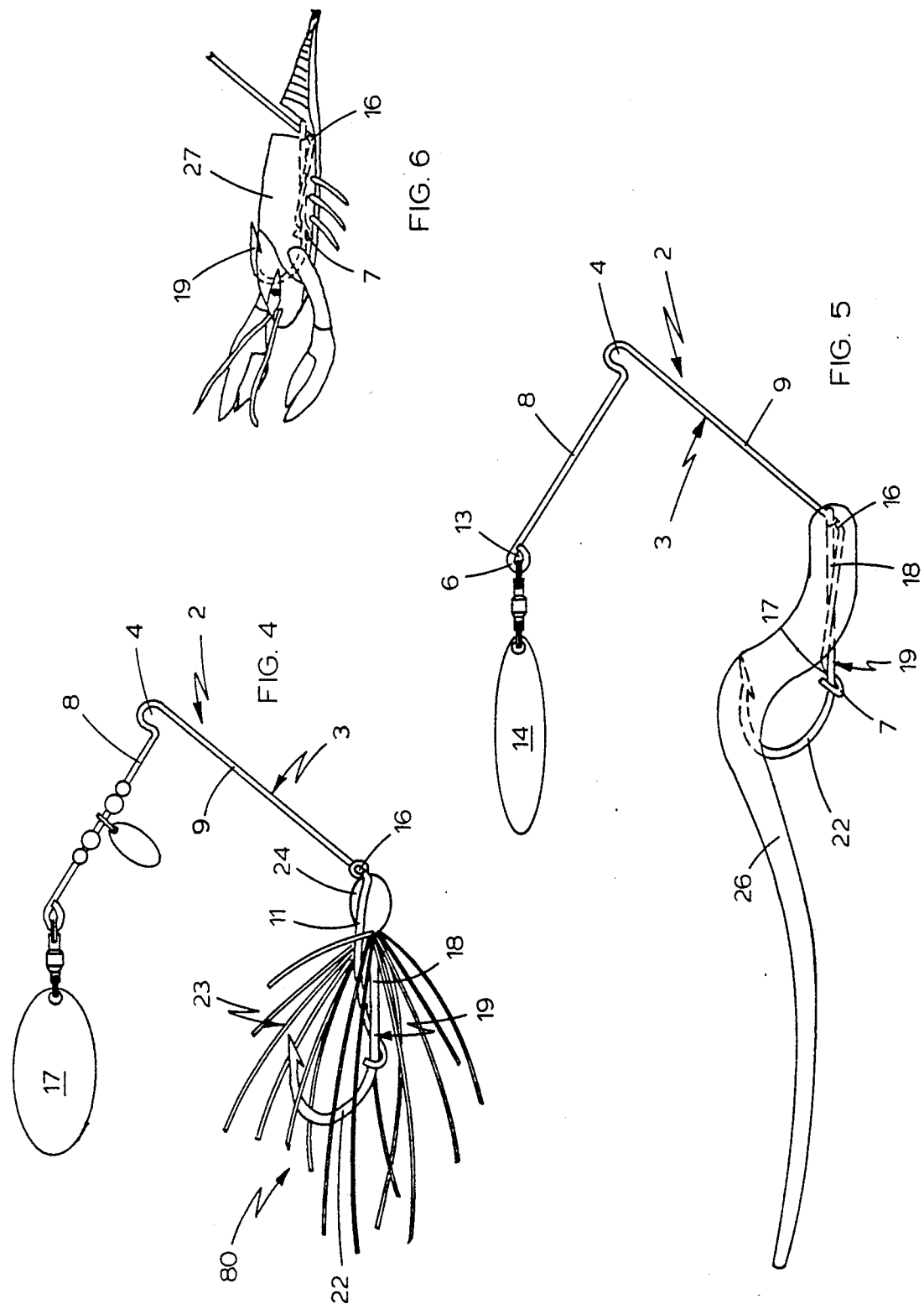

FISHING LURE HARNESS STRUCTURE

BACKGROUND OF THE INVENTION

This invention relates to fishing lure apparatus and more particularly to convertible harness structure capable of accommodating a plurality fishing lures and converting a casting lure to a spinner bait lure quickly and conveniently.

Individual casting lures and spinner bait lures are generally well known in the art, attention being directed to the several U.S. Pat. Nos. 1,832,768, issued to S.F. Davenport on Nov. 17, 1931; 3,546,804, issued to C.R. Woolums on Dec. 15, 1970; 3,750,325, issued to J.M. Feltman on Aug. 7, 1973; 3,808,726, issued to L.E. Flanagan, Jr. on May 7, 1974; 1,161,838, issued to D.D. Gapen on Jul. 24, 1979; 4,551,940, issued to D.S. East on Nov. 12, 1985; and 4,671,007, issued to W.G. Stanczyk on June 9, 1987. These patents teach or show single purpose lure arrangements including one or more spinner lures for fish attraction. These arrangements do not show, however, structure for quickly and conveniently converting between spinner baits and casting baits, in an easy and convenient method. In the structural arrangement of these aforedescribed patents, an integral shank and hook utilized in fish ensnarement is generally mounted at its shank end to an integral harness structure. Furthermore, the harness itself is often comparatively complex, being made from more than one wire body or a wire body which integrally incorporates the lure and/or hook including the spinner lure. Moreover, in some instances, the wire body is wound several times upon itself, creating an undesirable structural balance problem accomplished through a comparatively complex manufacturing step.

The present invention, recognizing these past structural problems and particularly those involved with the lure harness, provides a novel, convertible, integral harness structure which is straightforward and economical to manufacture and assemble, which requires a minimum of manufacturing and assembly steps and which requires a minimum of parts. In addition, the present invention provides an aligned, well balanced harness structure, which unique harness structure can be readily prepared or converted to various fishing lure arrangements prior to fishing, providing a novel structure for securely fastening and optimally disguising a preselectively offset shank and base portion of a fish ensnaring hook. Further, the present invention provides a novel harness structure which can be actuated and retrieved at varying speeds by a fisherman, the harness assembly offering a more natural appearance of spaced-apart and offset lures with a well-disguised, firmly assembled ensnaring hook.

Various other features of the present invention will become obvious to one skilled in the art upon reading the disclosure set forth herein.

SUMMARY OF THE INVENTION

More particularly, the present invention provides a unique and novel harness structure for converting fishing lures from casting bait to spinner bait and vice versa, comprising: an elongated integral wire body of preselected flexibility including a first bend intermediate the extremities of the wire body to provide a first loop for connection to the harness of a first fishing member with at least two leg members extending at a preselected angle relative each other from the first loop between the extremities of the wire body; the wire body including a second bend at one extremity thereof to provide a second loop for connection to the harness of a second fishing member; and, spaced third and fourth bends in the wire body, one of which bends is at the other extremity of the wire body, the spaced third and fourth bends being offset at preselected angles from the general common plane of the remainder of the leg members of the wire body for connection of the shank of a third fishing member to the harness to extend in a plane offset to the common plane determining the remainder of the leg members. It is to be understood that various changes can be made by one skilled in the art in one or more of the several part of the apparatus disclosed herein without departing from the scope or spirit of the present invention. For example, the lengths of the leg members, the relative angular relationship thereof and the geometry of one or more of the several loop can be change to vary the functional responsiveness of the novel harness when cast and retrieved during fishing.

BRIEF DESCRIPTION OF THE DRAWINGS

Referring to the drawings which disclose one advantageous embodiment of the inventive convertible harness structure and two modifications thereof:

FIG. 1 is an isometric view of the novel harness body disclosing a spinner lure connected to one leg member extremity thereof and the shank of an independent hook intertwined with another leg member thereof;

FIG. 2 is a side view of the harness body arrangement of FIG. 1;

FIG. 3 is a partial top plan view of the harness body arrangement of FIGS. 1 and 2 disclosing the offset relation of the hook and shank nesting leg member to the remainder of the harness body;

FIG. 4 is another side view of the harness body of FIGS. 1-3, modified to include a suitable jig and skirt member for weighted distribution and disguising the hook;

FIG. 5 is still another front end view of the harness body of FIGS. 1-3, modified to include another type of artificial lure for disguising the hook and the attachment with the harness;

FIG. 6 is a partial view of another embodiment of the present invention;

DESCRIPTION OF THE PREFERRED EMBODIMENT

Figure 6A:
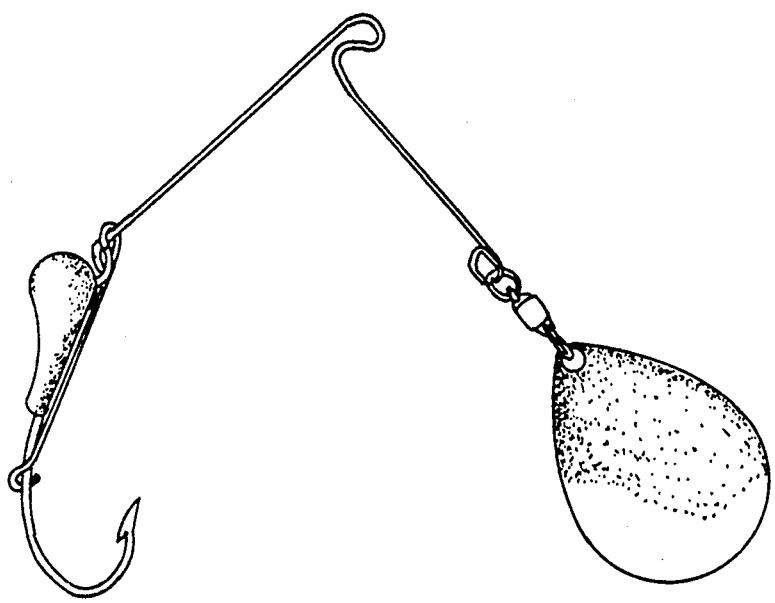
FIG. 6A is a view in perspective of a weighted embodiment of the invention, rotated one hundred eighty degrees for illustrative purposes.

Referring to FIGS. 1-3 of the drawings, a novel harness structure 2 for converting most common fishing lures to spinner baits is disclosed as including an elongated integral and flexible corrosion-resistant, wire body 3 which advantageously can be of a suitable flexible and bendable corrosion resistant wire material, such as, but not limited to, stainless steel or aluminum wire material, or even a suitable sturdy, flexible and formable plastic material. Wire body 3 includes a first bend 4 intermediate the opposite extremities 6 and 7 of wire body 3. Bend 4 is of "U" or "horseshoe" shaped configuration of approximately 180 degrees to provide a first loop with short leg 8 and a longer leg comprised of integral legs 9 and 11 extending from opposite ends of bend 4 with leg 9 extending at an approximately 90 degree or right angle to short leg 8. It is to be noted that legs 8 and 9 and first bend 4, forming the first loop, are in a substantially common plane with the first loop formed by first bend 4, serving to accommodate the tied end of a fishing line 12. It, of course, is to be understood that if desired, a suitable swivel (not shown) can be utilized to connect the end of line 12 to first loop formed by first bend 4.

A second bend 13 is provided at one extremity of wire body 3, namely the extremity of short leg 8. Bend 13, which can be of a 360 degree encircling or circular configuration, serves to provide an eye which also rests substantially in a common plane with legs 8 and 9 and bend 4. This eye serves to receive any one of a number of suitable spinner structures, such as a bright metallic spinner member 14. Again, it is to be understood that spinner member 14 can be connected to the eye formed by second bend 13 by any one of a number of swivel types known in the fishing art.

A third bend 16 in the wire body 3 intermediate the longer leg which is comprised of aforementioned integral legs 9 and 11 is of a generally, approximately double right angle step configuration serving to divide the long leg so that the portion adjacent the first loop formed by bend 4 serves as intermediate leg 9 and the remaining part of such long leg serves as second leg 11 extending in a generally common direction with first leg 8 and at an angle thereto—advantageously at approximately 70 degrees. As aforementioned, the short leg 8 extending in one direction from the first bend 4 of U-shape with its eye formed by encircling second bend 13 and the intermediate leg 9 extending from the other end of bend 4 approximately normal to short leg 8 are all substantially in the same common plane. The second leg 11 extending at an angle from intermediate leg 9, because of the approximately double right angle step bend 16 falls in a plane offset from the common plane determining short leg 8 and intermediate leg 9. This second leg 11 has a fourth bend 17 at the extremity thereof of generally U-shaped configuration extending approximately normal to the plane of the leg 11. In this regard, it is to be noted that the third bend 16 and fourth bend 17 are spaced apart a preselected distance—or in other words the length of second leg 11 is of a preselected length—which distance or length is compatible with the length of the shank 18 of hook 19 whereby shank 18 can be intertwined with second leg 11 with the eye 21 of hook 19 engaging in the third bend 16 and the base 22 of hook 19 nesting in the U-shaped fourth bend 17.

Referring to FIG. 4 of the drawings, it can be seen that the harness 2 can be used to convert any number of fishing lures to spinner baits. As there shown, a presently popular bait 80 is shown mounted to harness 2 in the manner described above. The lure or bait 80 includes a skirt 23 surrounding the stably supported intertwined hook 19. The skirt 23, as is known in the art, is formed from a plurality of plastic strips extending lengthwise from an integral, encircling band of the same plastic material or a weighted metal bug head with an eye portion as shown at 24 nesting with third bend 16.

Figure 6B:
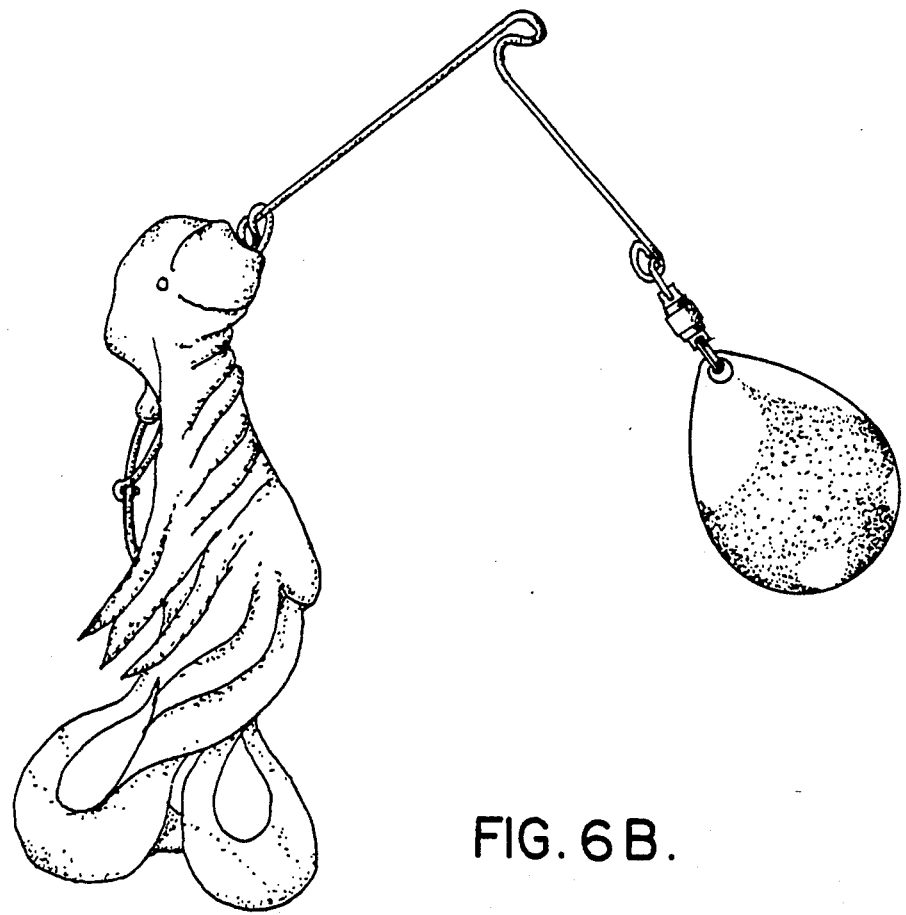
FIG. 6B is a view in perspective of the embodiment of FIG. 6A showing a lure in position.

FIG. 5 illustrates the further versatility of the inventive structure of harness 2 and shows the harness 2 being used to convert an artificial plastic worm bait to a spinner bait. The plastic worm is constructed from a suitable plastic material 26 which can be integral with hook 19 or separate therefrom and threaded along or surrounding the hook shank 18 and leg 11 to cover the hook, if desired. Most other lures of which I am aware can be converted to spinner baits in the manner described. For example, use of a crawdad lure 27 is shown in FIGS. 6A and 6B. This embodiment employs a suitable weight and operates in a weedless manner. That is, the fish hook is enclosed in the combined lure to permit the sure to function without snagging in weedy environments.

As thus described, a versatile and useful conversion device is provided. It is important to note that the arm 11 passes through the hook 22 at the eye 21. The interconnection of the hook 22 at the eye 21 and at the bend 17 provides a stable and secure attachment for the hook. I have found that the hook 22 will bend out of shape before the harness is deformed. The use of weighted jigs means the device of the present invention tracks true in normal operation.

Having thus described the invention, what is claimed and desired to be secured by Letters Patent is:

1. Convertible harness structure for fishing lures comprising:
    an elongated, integral wire body of preselected flexibility including a first bend intermediate the extremities of said wire body to provide a first loop for connection of a first fishing member to said harness with at least two leg members extending at a preselected angle relative each other from said first loop between the extremities of said wire body;
    said wire body including a second bend at one extremity thereof to provide a second loop for connection of a second fishing member to said harness, said second loop formed by said second bend being shaped to accommodate a spinner lure; and,
    spaced third and fourth bends in said wire body, one of which bends is at the other extremity of said wire body, said spaced third and fourth bends being offset at preselected angles from the general common plane of the remainder of the leg members of said wire body for connection of the shank of a third fishing member to said harness to extend in a plane offset to the common plane determining the remainder of the leg members.

2. The convertible harness structure of claim 1, said first loop formed by said first bend being shaped to accommodate the end of a fishing line.

3. The convertible harness structure of claim 1, said spaced third and fourth offset bends being spaced and shaped to nestingly accommodate the shank of a hook.

4. The convertible harness structure of claim 1, said elongated integral wire body including a third leg member intermediate said at least two leg members to extend between said first loop and said spaced third and fourth bends with said two leg members each extending at a preselected angle from opposite ends of said intermediate third leg member in a generally common direction whereby said elongated integral wire body is of generally U-shaped configuration.

5. The convertible harness structure of claim 1, said first bend forming said first loop being of generally U-shaped configuration with said leg members having at least portions thereof extending from the opposite ends of said first loop in a substantially common plane with said first loop and with each other.

6. The convertible harness structure of claim 1, said second bend forming said second loop being at an encircling configuration to provide an eye in a substantially common plane with said wire body adjacent thereto.

7. The convertible harness structure of claim 1, said offset bend at the extremity of said wire body being of offset U-shaped configuration.

8. The convertible harness structure of claim 1, said spaced third and fourth offset bands being shaped to nestingly accommodate the shank of a hook, said shank having an artificial bait in the form of a skirt surrounding the same with the eye thereof nesting in said third bend.

9. The convertible harness structure of claim 1, said spaced third and fourth offset bends being shaped to nestingly accommodate the shank of a hook, said shank having an artificial bait in the form of a plastic worm threaded along said hook shank to said third bend.

10. Convertible harness structure for fishing lures comprising:
   an elongated, integral and flexible corrosion resistant metallic wire body including a first bend intermediate the extremities of said wire body to provide a first loop of generally U-shaped configuration with short and long legs extending at a general right angle from the opposite ends of said first loop with said short leg and a portion of said long leg adjacent said first loop being in a substantially common plane with said first loop and with each other, said first loop serving to accommodate the tied end of a fishing line;
   a second bend at the extremity of said short leg of said wire body of encircling configuration to provide an eye in a substantially common plane with side short leg adjacent thereto, said eye serving to accommodate a spinner lure;
   a third bend in said long leg of said wire body of generally two right angle step configuration to divide said long leg so that said portion adjacent said first loop serves as an intermediate leg and said remaining portion of said long leg serves as a second leg extending in a generally common direction with said first leg and at an angle thereto to form said overall wire body into a generally U-shaped configuration with said second leg being in a plane offset from the common plane determining said first and intermediate legs, said second leg having a fourth offset bend at the extremity thereof of generally U-shaped configuration, said third and fourth bends being preselectively spaced from each other a distance compatible with the length of the shank of a preselected hook whereby said shank can be intertwined with said second leg with the hook eye engaging in said third bend and the base of said hook nesting in said U-shaped fourth bend.

11. A convertible harness structure for a fishing lure comprising:
   an elongate, integral wire body of preselected flexibility including a first bend intermediate the extremities of said wire body to provide a first loop, said first loop formed by said first bend being shaped to accommodate the end of a fishing line, at least two leg members extending at a preselected angle relative each other from said first loop between the extremities of said wire body;
   said wire body including a second bend at one extremity thereof to provide a second loop, said second loop formed by said second bend being shaped to accommodate a spinner lure; and,
   spaced third and fourth bends in said wire body, one of which bends is at the other extremity of said wire body, said spaced third and fourth bends being offset at preselected angles from the general common plane of the remainder of the leg members of said wire body for connecting the shank of a hook to said harness to extend in a plane offset to the common plane determining, the remainder of the leg members.

* * * * *